W. A. EBSEN.
WOODEN TANK VESSEL.
APPLICATION FILED NOV. 22, 1917.
1,276,042.
Patented Aug. 20, 1918.
5 SHEETS—SHEET 1.
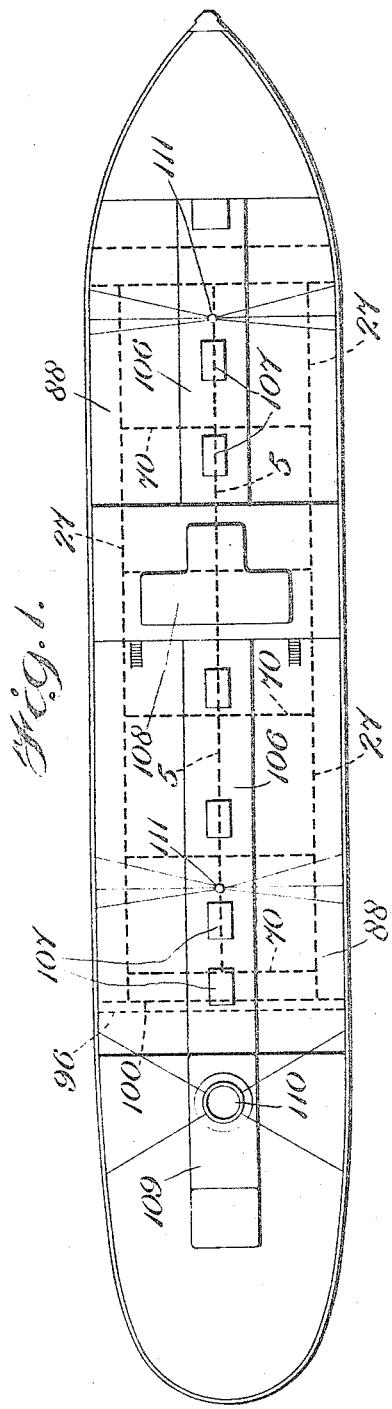
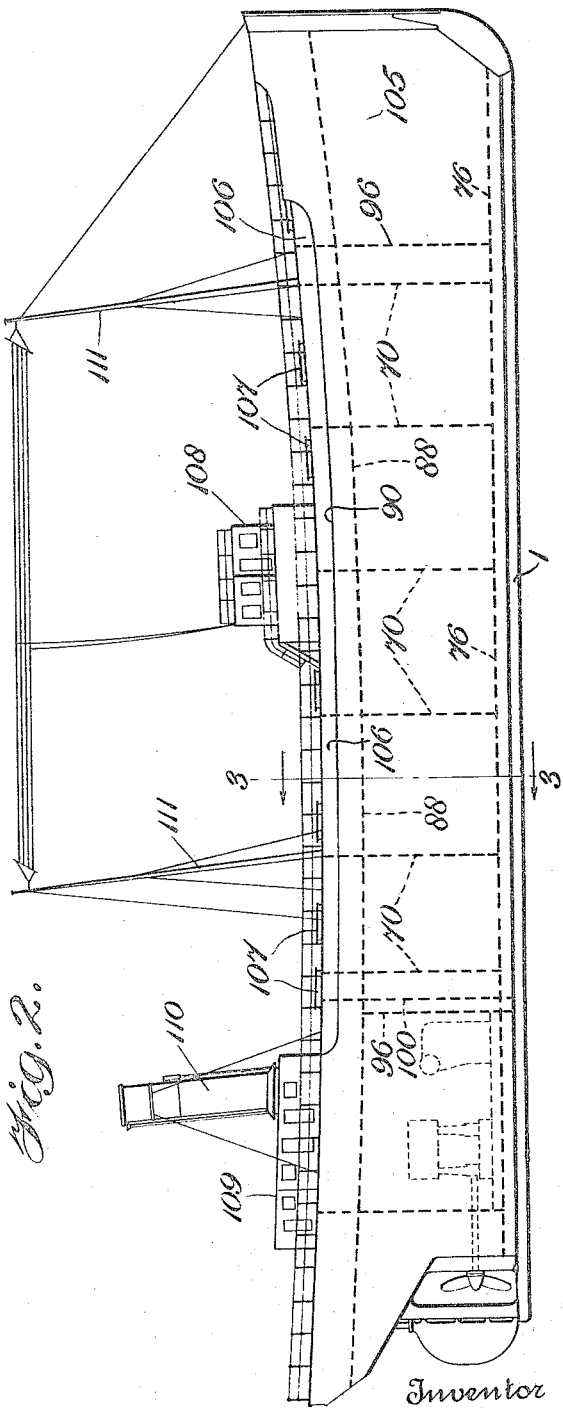
Inventor
W. A. Ebsen, by
T. W. Witherspoon
Attorney

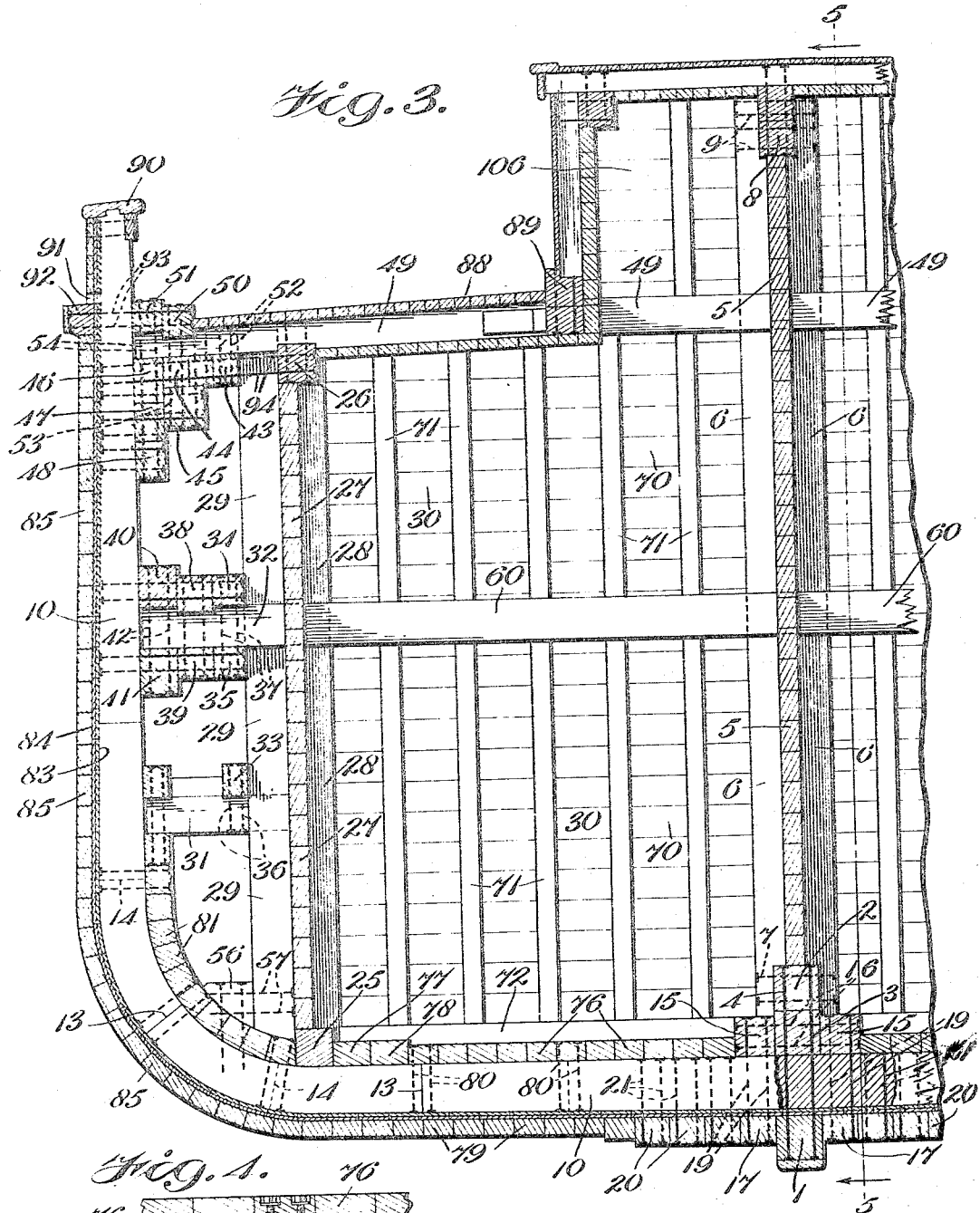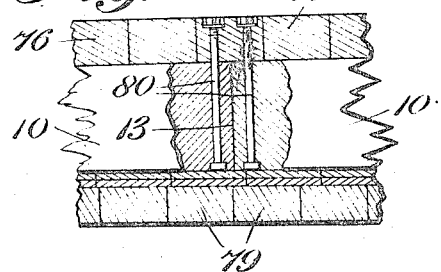

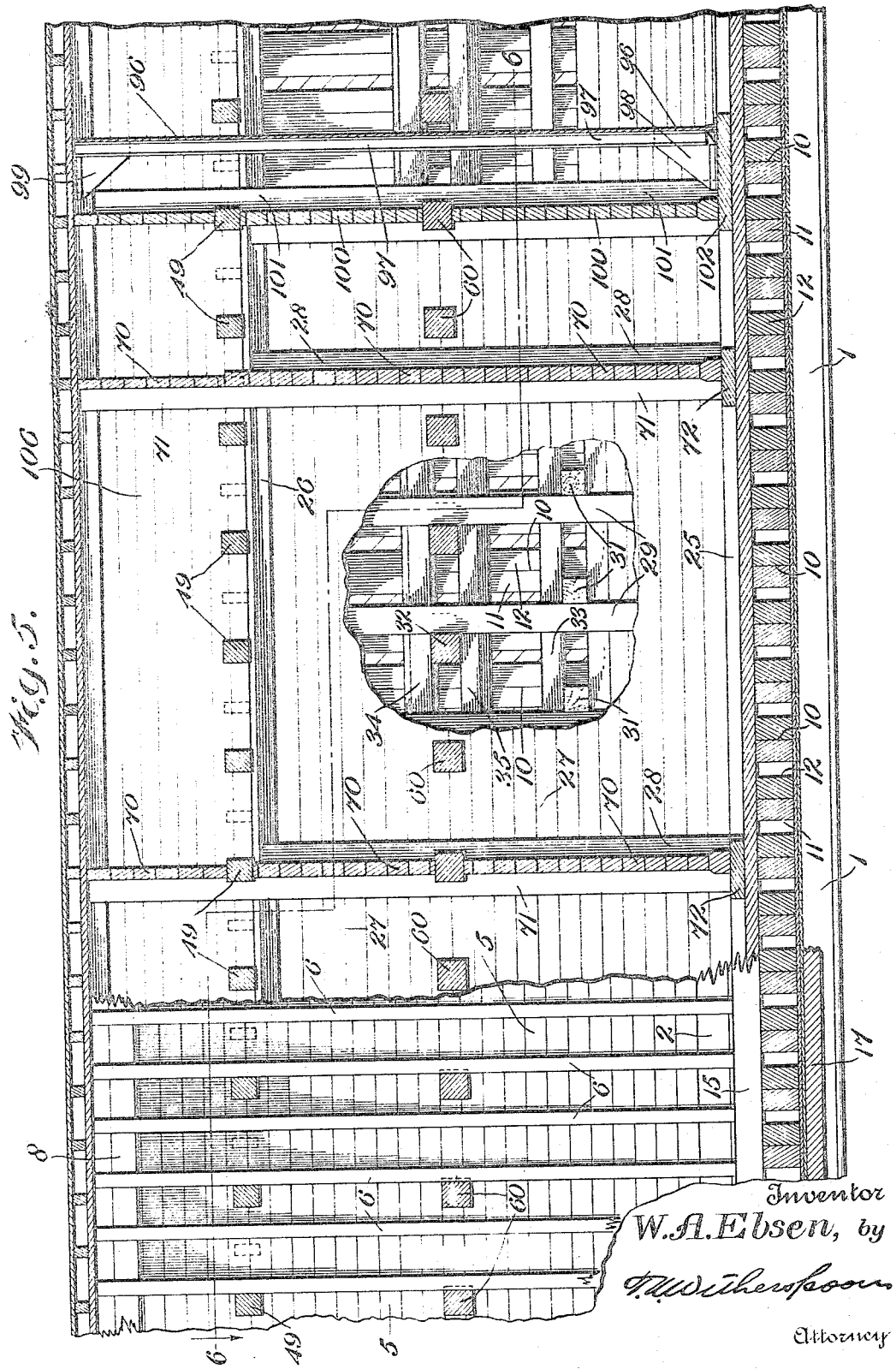

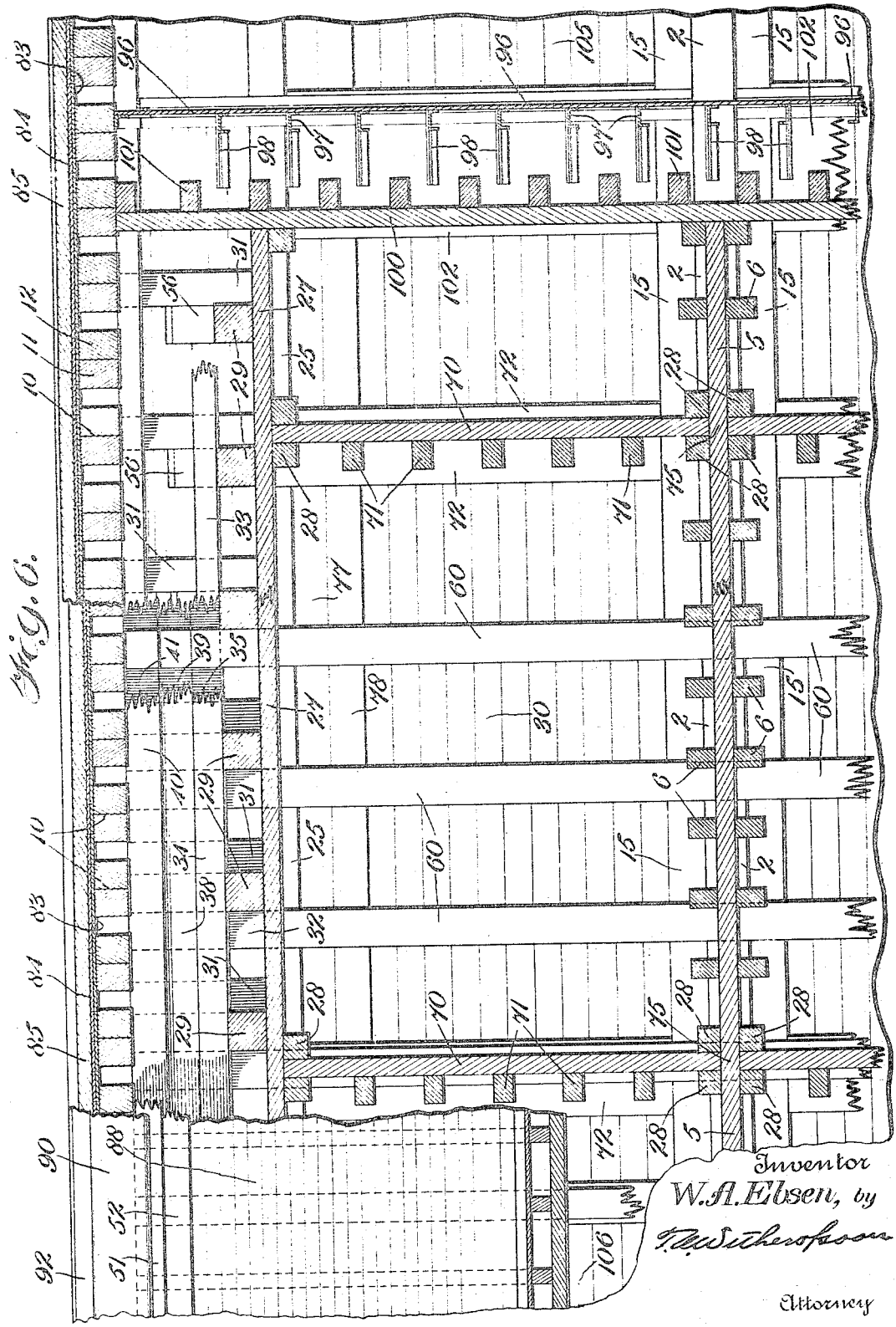

W. A. EBSEN.
WOODEN TANK VESSEL.
APPLICATION FILED NOV. 22, 1917.
1,276,042.
Patented Aug. 20, 1918.
5 SHEETS—SHEET 5.
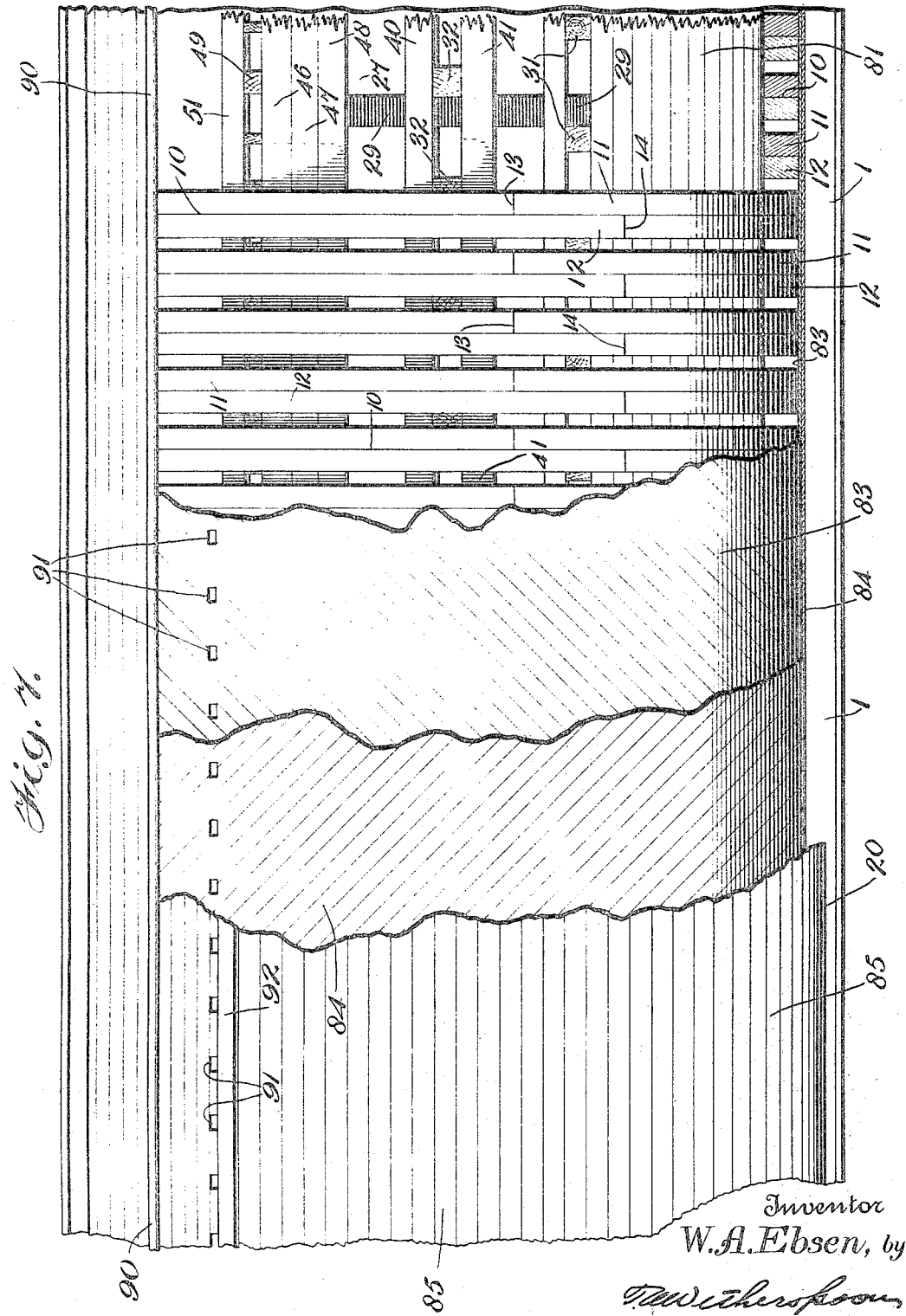

UNITED STATES PATENT OFFICE.

WILLIAM A. EBSEN, OF MONTCLAIR, NEW JERSEY, ASSIGNOR, BY MESNE ASSIGNMENTS, TO THE NATIONAL OIL COMPANY, A CORPORATION OF DELAWARE.

WOODEN TANK VESSEL.

1,276,042.  Specification of Letters Patent.  Patented Aug. 20, 1918.

Application filed November 22, 1917. Serial No. 203,420.

*To all whom it may concern:*

Be it known that I, WILLIAM A. EBSEN, a citizen of the United States, residing at Montclair, Essex county, in the State of New Jersey, have invented certain new and useful Improvements in Wooden Tank Vessels; and I do hereby declare the following to be a full, clear, and exact description of the invention, such as will enable others skilled in the art to which it appertains to make and use the same.

This invention relates to wooden vessels adapted to carry oil in wooden tanks, and has for its object to provide a vessel of this type which will be capable of a quicker construction, and more efficient in use than those heretofore proposed.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a diagrammatic plan view of a vessel made in accordance with this invention;

Fig. 2 is a side elevational view of the parts shown in Fig. 1;

Fig. 3 is an enlarged transverse, sectional view of a portion of the vessel taken on the line 3—3 of Fig. 2, looking in the direction of the arrows;

Fig. 4 is an enlarged detail sectional view illustrating the preferred form of fastenings employed throughout the vessel;

Fig. 5 is an enlarged sectional, longitudinal, elevational view of a portion of the vessel taken on the line 5—5 of Fig. 3, looking in the direction of the arrows, certain parts of the construction being broken away, and a portion of the longitudinal bulkhead 5 being shown for the purpose of clearness;

Fig. 6 is an enlarged sectional longitudinal plan view of a portion of the vessel taken on the line 6—6 of Fig. 5, certain parts of the construction being also broken away; and Fig. 7 is an enlarged elevational view of a portion of an outer side of the vessel, successive portions of the skin and interior construction being broken away for the sake of clearness.

1 represents the keel, 2 a keelson bolted to the keel by the long bolts 3 and 4, and 5 a longitudinal partition or bulkhead forming a sort of continuation of the keel and keelson to supply longitudinal strength and stiffness to the vessel, while at the same time, forming an inner wall or partition for said tanks, as will appear more fully hereinafter.

6 represents vertical stanchions or posts on each side of the bulkhead 5, the function of which is to support and stiffen said bulkhead, and they are secured at their lower ends to the latter, and to the keelson as by the through bolts 7, while they are secured at their upper ends to the longitudinal beam 8, or upper edge of said bulkhead 5, as by the through bolts 9. The transverse frames 10, are each made of a pair of sets of timbers 11 and 12, as shown, breaking joints with each other, as at 13, and 14 respectively. Said transverse frames are continuous from side to side, and pass between the keel 1 and keelson 2, as best shown in Figs. 3 and 5. Immediately above the frames 10 on each side of the keelson 2 are the longitudinals 15 which are securely bolted to said keelson 2, by the through bolts 16, and on each side of the keel 1 are corresponding longitudinals 17 which are likewise bolted to the keel 1, by bolts similar to those lettered 16, but not appearing in the drawings.

The said longitudinals 15 and 17 are securely bolted to each other and to the transverse frames 10 by the vertically disposed through bolts 19, so that the keel and keelson as well as the frames are bound together in the most solid manner. In order to still further stiffen the structure, a plurality of outer longitudinal strakes or timbers 20, heavier than the normal, are successively placed on each side of the outer timbers 17, and are further secured to the transverse frames 10 as by the through bolts 21, thus still further bracing the joint between the transverse frames and the keel and keelson.

The main frame-like structure of the vessel consisting of said transverses 10, keel and keelson, and longitudinal bulkhead 5, being thus firmly and strongly united into a single structure, there is next provided on the inside of this structure the wooden tanks for carrying the oil or other liquid cargo, and they are so built into the said structure as to still further brace the ship as a whole, and to lend longitudinal and transverse strength, as will now be disclosed. On the interior of the vessel at or near the bilges thereof are placed the longitudinal timbers 25 constituting the lower outboard corners of the tanks, and above these said timbers 25, and extending to the upper longitudinal timbers 26, are the outboard walls of the tanks. Said walls 27 are securely braced by the vertically disposed stanchion-like members 28, placed on the inside of the tanks as shown, and said walls 27 are further braced by the similarly disposed vertical stanchion-like members 29 placed on the outside of said tanks as best shown in Figs. 3 and 6. In order to firmly support the said vertically disposed members 29, and thus to more effectually take the strain exerted on the interior of the tanks 30, there is provided the horizontally disposed short transverse members 31 and 32 extending from the walls 27 of said tanks to the outer transverse frames 10, as clearly shown in Figs. 3 and 6.

There is also provided above each set of members 31 and 32 the longitudinally disposed members 33 and 34 which contact with said members 29, and said members 31 and 32, as illustrated. The said members 33 are firmly bolted to the members 31 as by the through bolts 36, and the said members 34 and 35, which are placed respectively above and below the members 32, are firmly bolted to said members 32 as by the through bolts 37.

In order to still further take the outward thrust exerted on the walls 27, there is provided the additional longitudinal members 38 and 39 which are firmly bolted to said members 32, as shown, and between said members 38 and 39, and the transverse frames 10, there is provided the additional longitudinal members 40 and 41 which are likewise firmly bolted to the members 32 by the through bolts 42, as will be clear from Fig. 3 of the drawings.

At or near the tops of the stanchion-like members 29 there is provided the successive longitudinal members 43, 44, 45, 46, 47 and 48, and above the transverse beams 49 there is provided the complementary longitudinal members 50 and 51. The said members 43 are securely bolted to and through the beams 49, as by the bolts 52, the said members 50 above said beams and the said members 44 and 45 below said beams are firmly bolted together by similar through bolts 53, and the said members 51 above the beams 49 are securely bolted to the said members 46, 47 and 48 as by the through bolts 54.

At or near the bottom ends of said vertical stanchions 29 I place the longitudinal filling members 56 and bolt the same securely to said members 29 as by the through bolts 57. It thus results that the outward thrust, experienced by the tank walls 27, is resisted by the solidly and firmly braced construction shown, so that there is no possible way for the said walls to spring and thereupon permit of leakage of the oil therethrough.

In order to still further stiffen the structure, on the interior of the tanks 30 there is provided the longitudinally disposed transverse members 60 which are preferably located in line with the members 32, and which, with said members 32, constitute horizontally disposed bracing members from one vertical frame 10 on one side of the vessel to a corresponding vertical frame 10 on the opposite side of the vessel. It therefore results that the two sets of bracing members 60, when combined with the corresponding two sets of bracing members 32, constitute a sort of secondary transverse beams located below the beams 49, which serve to effectually stiffen the ship at or about the middle of the depth of the tanks 30.

It will now be seen that when one considers the firm manner in which the keel, the keelson, bulkhead 5, and the transverse frames 10 are secured together, and when one considers the upper transverse beams 49 extending from side to side of the ship, and the secondary or lower transverse beams or bracing members 32 and 60 which extend from side to side of the ship, there is provided an exceedingly strong frame or structure which is still further stiffened by the two longitudinally disposed walls 27 of the tanks 30, and by the bracing members 29, 28, 31 and 33, which support said walls 27.

This said structure is still further enhanced by carrying the walls 27 continuously throughout the length of the tanks on each side of the center line bulkhead 5. It thus results that the structure just described really provides three longitudinal bulkheads, one passing through the center of the vessel, and constituting an extension of the keelson, while the other two are located near the outboard portions of the vessel, and all three being firmly built in and furnishing a portion of the longitudinal strength of the vessel. The three longitudinal bulkheads lettered 5 and 27 are divided off at suitable intervals by the transverse partitions 70 to form the ends of the tanks 30, and said ends 70 are provided on one side with the vertically disposed stanchion-like members 71, in order to more effectually brace the same.

Said ends 70 and members 71 are conveniently stepped on the transverse members 72 resting below the lower ends of the members 71, and the ends or partitions 70 of the tanks to provide a better and more liquid tight joint. Opposite the vertical members 28 located in the four corners of a tank such as 30, there are located in the corners of similar tanks, duplicate members 28, so that at a point such as 75, (see Fig. 6), where four corners of four tanks meet, there are provided four members 28 which serve not only to brace and stiffen the tanks at such points, but they further serve to provide liquid tight joints which is a very important feature in wooden tanks adapted to carry oil at sea.

76 represents longitudinally disposed ceiling members disposed above the transverse frames 10 on each side of the keelson and between the same, and the longitudinal stiffening members 77 and 78, located inside the tank walls 27, and serving to further brace the members 25 and the lower corners of the tanks. Said members 76, 77 and 78 constitute the bottoms of the tank 30, and are secured to the transverse frames 10 by the through bolts 80, while the outer wooden skin or plating strakes 79 are secured to said frames 10 by bolts not shown but which are similar to said bolts 80 and 21. Outside the longitudinal bulkheads or tank walls 27 and following the inner surfaces of the transverses 10 are the longitudinally disposed members 81 which fit snugly the space between the longitudinal members 25 and the transverse bracing members 31 as shown, thus firmly holding said members 25 and 31 in place while still further strengthening the ship at its bilges.

On the outer surfaces of the transverse frames 10 there is placed diagonally a layer 83 of sheeting material and outside of this said layer, there is disposed, at an angle thereto, another layer 84 of similar sheeting material as best shown in Fig. 7. These two layers of sheeting material are of relatively thin timber, they are flexible, and are easily put on water tight. Their flexibility enables them to yield to the severe pitching and racking strains to which a vessel is subjected in a sea-way without springing a leak, and they thus constitute a valuable feature in connection with the much heavier and stronger outer sheathing, or skin 85, in preventing leaks in a sea-way, or during heavy weather.

88 represents the deck planking firmly held in place between the longitudinals 89 and 50, see Fig. 3. 90 represents the rail and 91 the scuppers, below which is located the heavy longitudinal rail and fender member 92. The said heavy members 50, 51 and 92 are firmly bound together and to the transverses 10 by the long through bolts 93, while the still longer through bolts 94 pass through and firmly hold together the transverses 10 and the longitudinal stiffening members 26, 43, 44 and 46.

The extra heavy timbers 50, 51, 92, 26, 43, 45 and 46 and their fastenings just disclosed constitute an important feature of this invention, for they serve to so stiffen the upper edge or rim of the vessel's framework, and to so bind the same to the top edges of the tanks 30, that they most effectually resist the racking and twisting strains in heavy weather, and therefore, constitute a safeguard against leaks.

At each end of the vessel there is provided a steel bulkhead or cofferdam 96, see Figs. 2, 5 and 6, which extends from the vertical transverse frames 10 on one side to the vertical transverse frames on the other side of the vessel. Each of these said bulkheads 96 is braced with the vertical steel stanchion like members 97 provided with the brackets 98 at the bottoms thereof, and with the brackets 99 at the tops thereof in order to stiffen the same.

Separated from said steel bulkheads 96 and also extending from the transverse frames on one side of the vessel to the transverse frames on the other side of the vessel are the terminal or extreme tank end bulkheads 100 made of wood. These said bulkheads are in all respects similar to the bulkheads 70, except that they extend beyond the longitudinal sides of the tanks as shown, and they are similarly provided with the outer bracing stanchion-like vertically disposed members 101 as shown. Both the bulkheads 96 and 100 are conveniently stepped on the broad lower transversely disposed member 102 which enables a liquid tight joint to be simply and effectually provided.

The space 105 in the vessel forward of the bulkhead 96 may be utilized for stores of various kinds, and should a fire break out in the same, the said bulkhead 96 acts as an effectual barrier to prevent said fire from reaching the oil in the tanks 30. Likewise the rear steel bulkhead 96 serves to effectually shut off the engine room and boiler space from the oil tanks and to also act as a barrier against fire reaching said oil or against the oil leaking aft and reaching the engine or boiler rooms. These said transverse bulkheads 96 and 100 extending from side to side of the vessel naturally greatly stiffen transversely the vessel at its extreme ends and thus enables her to resist the pitching and rolling motions and severe strains brought thereby, in heavy seas. That is to say, as is well known these particular strains acting on the extreme ends of the vessel, act with great leverages and therefore, it is important in a vessel of this nature adapted to carry oil that the structure be made unusually strong at the bows and stern in order to prevent leaks occurring in heavy weather.

106 represents the usual expansion trunk which extends throughout the lengths of the tanks, while 107 represents hatches for entering the tanks or other spaces in the hold of the vessel. 108 represents a super-structure suitable for the captain's quarters, navigation, etc., 109 a structure suitable for the quarters of the crew, 110 a smoke stack and 111 any suitable masts which it is desired to provide.

It will now be clear that by firmly uniting the keelson and keel to the frames 10 by means of the long through bolts, or tie rods 3 and 4, by providing the longitudinal inner stiffening members 15 on each side of the keelson, and the longitudinal outer stiffening members 20 on each side of the keel and by firmly binding said members 15 to said members 20 and to the frames 10, an exceedingly strong joint is had between said frames and said keel and keelson, which is enhanced by the through bolts or tie rods 16 and 21. It will be further observed that the upper outboard longitudinal stiffening members 43, 45, 48, 50 and 51 are similarly tied to the beams 49 by the tie rods such as 53 and 54, and to the frames 10 by the tie rods such as 44 and 94 so that the outer rim of the hull is rendered exceedingly stiff, or rigid, thus producing a skeleton frame work out of wood capable of resisting great strains. And it will now be clear that this said strong skeleton frame work is very greatly stiffened longitudinally by the three parallel bulkheads 5 and 27 which are transversely braced by the beams 49, 32 and 60, as well as by the end transverse bulkheads 100, extending from side to side of the vessel. In other words, there is built into the skeleton frame work above described a rectangular frame work formed by the bulkheads 27 and 100, and through the center of which passes the bulkhead 5. This said rectangular frame work is further braced transversely by the tank wall partitions 70, and the beam members 32 and 60 and their associated members 28, 29, 34, 38, 40, etc.

In addition to the foregoing the transverse steel bulkheads 96 extending from side to side of the vessel at each end, still further stiffen the above mentioned skeleton frame work, and enable the vessel to effectually resist twisting and racking strains, which otherwise might open her seams. In order that the through bolts or tie rods such as 80, for example, may fit liquid tight, the holes which they fill are bored slightly smaller than said rods, and the latter are driven in place, all as will be readily understood from Fig. 4. Again by applying the flexible sheet material 83, 84 between the outer skin 85 and the frames, a water tight outer sheathing is readily produced.

It is obvious that those skilled in the art may vary the details of construction as well as the arrangement of parts without departing from the spirit of the invention and therefore, I do not wish to be limited to the above disclosure except as may be required by the claims.

What I claim is:—

1. In a wooden vessel for carrying a liquid cargo the combination of continuous transverse frames; a keel below said frames; a keelson above said frames; a continuous, center line, longitudinal bulkhead forming a continuation of said keelson and constituting a wall of a plurality of tanks; a continuous, wooden outboard, longitudinal bulkhead on each side of said center line bulkhead each also constituting a wall of a plurality of tanks; transverse wooden partitions forming a plurality of wooden tanks extending between said outboard and center line bulkheads; and a transverse steel bulkhead extending from side to side in the bow and stern portions of the vessel and spaced from said wooden tanks, substantially as described.

2. In a wooden vessel for carrying a liquid cargo, the combination of continuous transverse frames; a continuous layer of sheeting material located on the outside of said frames and following the contour of the ship; outer planking material constituting the outer skin of the ship located outside of said sheeting material; a keel below said frames; a keelson above said frames; a continuous, center line, longitudinal bulkhead forming a continuation of said keelson and constituting a wall of a plurality of tanks; a continuous, wooden outboard longitudinal bulkhead on each side of said center line bulkhead each also constituting a wall of a plurality of tanks; bracing material between said last named bulkheads and said transverse frames; transverse wooden partitions forming a plurality of wooden tanks extending between said outboard and center line bulkheads; and a transverse steel bulkhead extending from side to side in the bow and stern portions of the vessel and spaced from said wooden tanks, substantially as described.

3. In a wooden vessel for carrying a liquid cargo the combination of continuous transverse frames; a keel below said frames; a keelson above said frames; a continuous, center line, longitudinal bulkhead forming a continuation of said keelson and constituting a wall of a plurality of tanks; a continuous, outboard, longitudinal bulkhead on each side of said center line bulkhead each also constituting a wall of a plurality of tanks; longitudinal stiffening members near the upper ends of said frames; longitudinal stiffening members at the top edges of said outboard bulkheads; tie rods passing through said stiffening members and said frames; tie rods passing through said keel, said frames and said keelson; and transverse partitions forming a plurality of tanks extending between said outboard and center line bulkheads.

4. In a wooden vessel for carrying a liquid cargo, the combination of a frame work provided with additional longitudinal wooden stiffening members at the juncture of its upper deck and sides, as well as on the inside of its bilges, and on each side of its keel; a centerline longitudinal wooden bulkhead constituting one wall of a plurality of tanks; an outboard longitudinal wooden bulkhead on each side of said center line bulkhead also constituting walls of a plurality of tanks; through metal fastenings between said outboard bulkheads and said first named stiffening members; and connections between said outboard bulkheads and said stiffening members located on the inside of the bilges, substantially as described.

5. In a wooden vessel for carrying a liquid cargo the combination of a frame work comprising continuous transverse frames, a keel and a keelson, and provided with additional longitudinal stiffening members at the juncture of its upper deck and sides, as well as on the inside of its bilges, and on each side of its keel; a centerline longitudinal bulkhead constituting a continuation of the keelson and forming one wall of a plurality of tanks; an outboard longitudinal bulkhead on each side of said center line bulkhead also constituting walls of a plurality of tanks; longitudinal stiffening members located at the top and bottom edges of said outboard bulkheads; transverse partitions extending between said bulkheads to complete the tanks; fastenings between said outboard bulkheads and said first named stiffening members; and connections between said outboard bulkheads and said stiffening members located on the inside of the bilges, substantially as described.

6. In a wooden vessel for carrying a liquid cargo the combination of a framework comprising transverse frames, a keel and a keelson, and provided with additional longitudinal stiffening members at the juncture of its upper deck and sides as well as on the inside of its bilges, and on each side of its keel; a centerline longitudinal bulkhead constituting one wall of a plurality of tanks; an outboard longitudinal bulkhead on each side of said center line bulkhead also constituting walls of a plurality of tanks; a continuous layer of sheeting material on the outside of said frames; an outer skin outside of said sheeting material; fastenings between said outboard bulkheads and said first named stiffening members; and connections between said outboard bulkheads and said stiffening members located on the inside of the bilges, substantially as described.

7. In a wooden vessel for carrying a liquid cargo the combination of a framework longitudinally stiffened at its upper rim portion and at the keel; a center-line longitudinal bulkhead forming a dividing wall between a plurality of tanks; a longitudinal bulkhead on each side of said centerline bulkhead constituting outer walls of said tanks; transverse partitions between said bulkheads constituting end walls of said tanks; a transverse wooden bulkhead extending from side to side of the vessel located forward of, and abaft said tanks; and a steel bulkhead extending from side to side of the vessel and located forward of and abaft said last named wooden bulkheads, substantially as described.

8. In a wooden vessel for carrying a liquid cargo the combination of a framework longitudinally stiffened at its upper rim portion and at the keel; a center-line longitudinal bulkhead forming a dividing wall between a plurality of tanks; a longitudinal bulkhead on each side of said centerline bulkhead constituting outer walls of said tanks; transverse partitions between said bulkheads constituting end walls of said tanks; transverse stiffening members extending between said outer walls and the ship's side, and also extending through said tanks below the tops and above the bottoms thereof; a transverse wooden bulkhead extending from side to side of the vessel located forward of and abaft said tanks, and providing storage spaces; and a steel bulkhead extending from side to side of the vessel and located forward of, and abaft said last named wooden bulkheads and spaced therefrom, substantially as described.

In testimony whereof I affix my signature in presence of two witnesses.

WILLIAM A. EBSEN.

Witnesses:
 GUY C. VAN ALSTYNE,
 J. W. FAIRBANK.